UNITED STATES PATENT OFFICE.

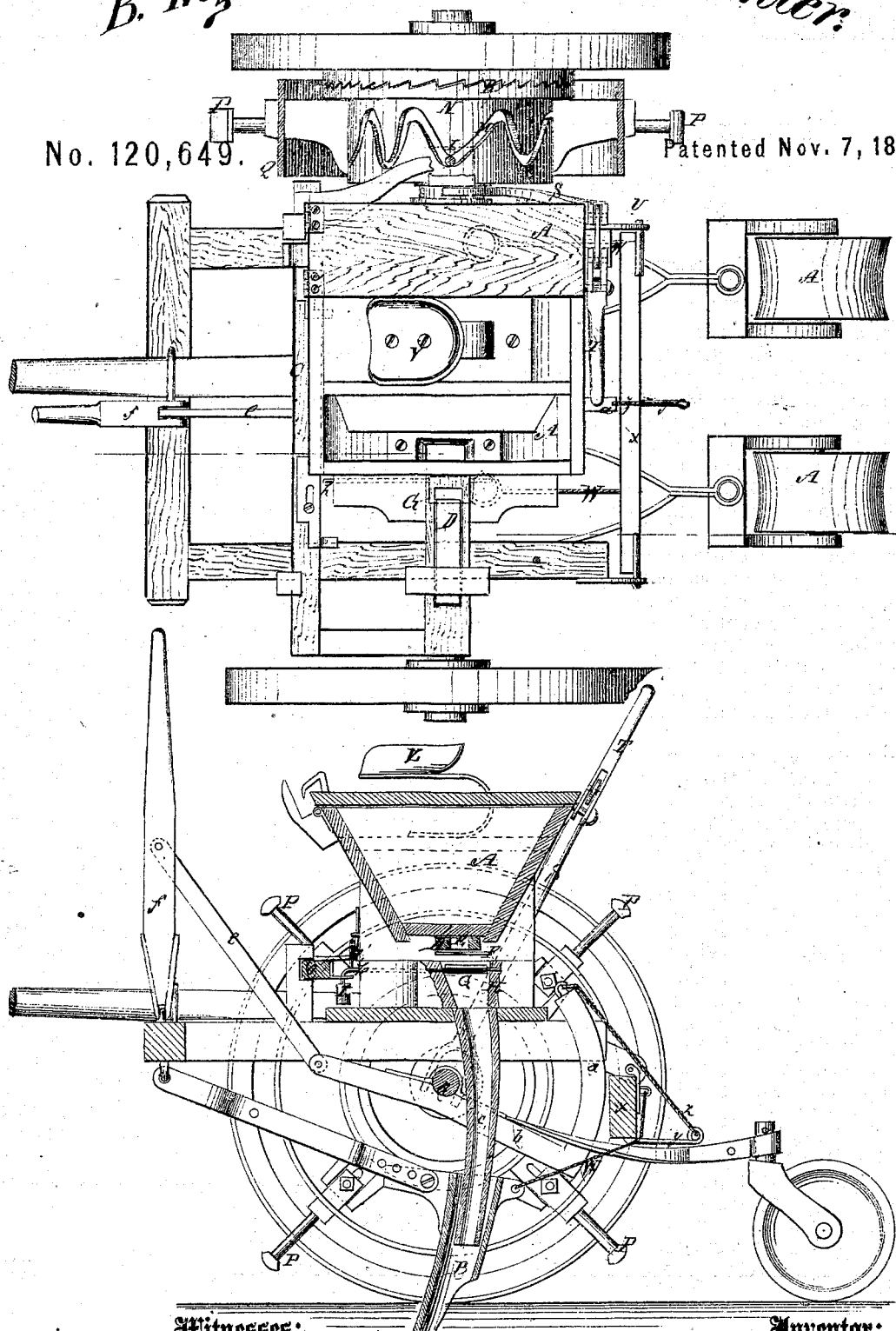

BENDIX INGEBRIGTSON, OF CAMBRIDGE, WISCONSIN.

IMPROVEMENT IN CORN-PLANTERS.

Specification forming part of Letters Patent No. 120,649, dated November 7, 1871.

*To all whom it may concern:*

Be it known that I, BENDIX INGEBRIGTSON, of Cambridge, in the county of Dane and State of Wisconsin, have invented a new and Improved Corn-Planter; and I do hereby declare that the following is a full, clear, and exact description thereof, which will enable others skilled in the art to make and use the same, reference being had to the accompanying drawing forming part of this specification.

This invention relates to improvements in corn-planters; and it consists in certain improvements in dropping-gear, all as hereinafter described.

Figure 1 is a plan view of the machine, except the cam-wheel for working the dropper-slides, which is sectional; and Fig. 2 is a sectional elevation taken on the line $x\ x$ of Fig. 1.

Similar letters of reference indicate corresponding parts.

A represents the corn-hoppers, arranged above he drill-openers B and the spouts leading thereto, but a little one side—that is, to the right from the vertical axis of the said spouts. D represents the dropping-slide, which receives the corn in the holes E, carries it beyond the plates F, and drops it onto a tilting-gate, G, in the top of a hopper, H, over the spouts, which gates are held closed by the pendent weights I on the spindles K of said valves. They are also prevented from shaking by a spring, $a$, applied to each. The dropper-slide D has a stud-pin, L, at one end, working in the zigzag cam-groove M in the wheel N, clutching with one of the driving-wheels, and drops the corn when it is moved to the left. O is another slide connected to D and moving simultaneously with it to tilt the gates G, which it does just at the end of the movement of said slide to the right. P represents marking-arms, with blocks on the ends projecting from the cam-wheel N through a strengthening-band, Q, for marking the rows perpendicular to the way the machine runs. These arms are intended to be so arranged with the cam-groove that a mark is to be made simultaneously with the movement of the tilting-gates. The arms P are mounted adjustably in the strong arms P' projecting from the cam-wheel and supporting the rim Q. These gates are used because they act quickly and insure the dropping at the right moment to agree with the lines marked by the markers. The cam-wheel connects with the driving-wheel by a rose-clutch, R, and is shifted along the shaft to gear or ungear with it by a clutch-lever, S, and hand-lever T, suitably pivoted and connected by a bar, U, to be manipulated by the driver while sitting on the seat V. The drill-openers B are connected by cords W to the lifting-bar X, and this bar is connected by the arm Y and cord Z to the segmental end $a$ of a lever, $b$, pivoted to the axle at $d$, and connected by a link, $e$, with a lever, $f$, jointed to the top of the frame at the front, where it is in convenient reach of the attendant, to be operated by him, while sitting on his seat, to raise the said drill-openers and let them down again when required to pass obstructions or in turning around corners. When turning corners, or at any time when the marker does not match correctly with the marks previously made, the cam-wheel is ungeared with the driving-wheel and turned until it matches correctly, and is then geared with the drum again. A' represents a pair of covering-rollers attached to the machine and following along in the wake of the drill-openers.

Having thus described my invention, I claim as new and desire to secure by Letters Patent—

The tilting-gates G, operated by the tilting-slide O at the end of the return movement of the dropper-slide D and simultaneous with the action of the markers P on the ground, substantially as specified.

BENDIX INGEBRIGTSON.

Witnesses:
  W. D. POTTER,
  JEN. J. NURET.